United States Patent [19]

Forsythe et al.

[11] Patent Number: 5,370,920
[45] Date of Patent: Dec. 6, 1994

[54] PROCESS FOR PRODUCING CATALYST COATED THERMAL SHOCK RESISTANT CERAMIC HONEYCOMB STRUCTURES OF CORDIERITE, MULLITE AND CORUNDUM

[75] Inventors: George D. Forsythe, Landenberg, Pa.; Giovindasamy P. Rajendran, Newark, Del.

[73] Assignee: E. I. Du Pont de Nemours and Company, Wilmington, Del.

[21] Appl. No.: 940,698

[22] Filed: Sep. 14, 1992

Related U.S. Application Data

[60] Continuation-in-part of Ser. No. 773,202, Oct. 8, 1991, Pat. No. 5,168,092, which is a division of Ser. No. 516,705, Apr. 30, 1990, Pat. No. 5,079,064.

[51] Int. Cl.⁵ .............................. B32B 3/12
[52] U.S. Cl. .................... 428/131; 428/105; 428/113; 428/114; 428/116; 428/284; 428/285; 428/294; 428/902
[58] Field of Search ............ 427/376.1; 428/295, 428/902, 289, 105, 113, 114, 116, 131, 284, 285, 294

[56] References Cited

U.S. PATENT DOCUMENTS

| | | | |
|---|---|---|---|
| 3,244,540 | 4/1966 | Hailstone et al. | 106/67 |
| 3,255,027 | 6/1966 | Talsma | 106/65 |
| 3,298,842 | 1/1967 | Seufert | 106/65 |
| 3,949,109 | 4/1976 | McBride | 428/36 |
| 3,986,528 | 10/1976 | Green | 138/177 |
| 4,069,157 | 1/1978 | Hoover et al. | 210/433 M |
| 4,092,194 | 5/1978 | Green | 156/89 |
| 4,258,099 | 3/1981 | Narumiya | 428/311 |
| 4,280,845 | 7/1981 | Matsuhisa et al. | 106/62 |
| 4,435,512 | 3/1984 | Ito et al. | 501/32 |
| 4,544,408 | 10/1985 | Mosser et al. | 106/14.12 |
| 4,568,402 | 2/1986 | Ogawa et al. | 156/89 |
| 4,650,699 | 3/1987 | Mosser et al. | 427/240 |
| 4,741,792 | 5/1988 | Matsuhisa et al. | 156/89 |
| 4,810,681 | 3/1989 | Hayakawa | 501/119 |
| 4,812,276 | 3/1989 | Chao | 264/177.11 |
| 4,849,275 | 7/1989 | Hamaguchi et al. | 428/116 |
| 4,869,944 | 9/1989 | Harada et al. | 428/116 |
| 4,956,329 | 9/1990 | Chao et al. | 502/251 |
| 5,078,818 | 1/1992 | Han et al. | 427/376.1 |
| 5,079,064 | 1/1992 | Forsythe | 428/131 |

Primary Examiner—James J. Bell

[57] ABSTRACT

A ceramic honeycomb structure containing $SiO_2$, $Al_2O_3$ and MgO primarily in the form of cordierite, mullite and corundum and having extensive microcracking provides high resistance to thermal shock, and is useful as a substrate for catalysts. Such a structure is prepared by coating a preform of glass fibers with an alumina dispersion and firing the coated preform so that the glass and alumina react to form cordierite, mullite and corundum.

3 Claims, 1 Drawing Sheet

PROCESS FOR PRODUCING CATALYST COATED THERMAL SHOCK RESISTANT CERAMIC HONEYCOMB STRUCTURES OF CORDIERITE, MULLITE AND CORUNDUM

This application is a continuation-in-part of U.S. Ser. No. 07/773,202 filed Oct. 8, 1991 now U.S. Pat. No. 5,168,092 which is a divisional of U.S. Ser. No. 07/516,705 filed April 30, 1990 now U.S. Pat. No. 5,079,064.

BACKGROUND OF THE INVENTION

This invention relates to catalyst coated ceramic structures which have high resistance to thermal shock.

Many electric utility companies maintain standby gas-fired generators which are reserved for use in times of peak demand or emergency shutdown of other generating facilities. Such generators employ large compressors to force air through combustion zones where natural gas is burned. The resulting heated combustion product is used to drive turbines for the generation of electricity.

The temperature of a natural gas flame at its hottest point is sufficient to form some nitrogen oxides which are objectionable from an environmental point of view. Treatment of the entire exhaust gas stream to remove nitrogen oxides would be prohibitively expensive. One alternative would be to accomplish combustion of the natural gas with the use of a catalyst, which could decrease the combustion temperature to a level at which nitrogen oxides are not created. However, the support structure for the catalyst must be able to withstand the temperature of catalyzed gas combustion, about 1260° C., and must also be able to withstand repeated cycles of thermal shock created when the generator is started up and is shut down. When such a generator is shut down, the gas supply is cut off, but compressed air continues to flow through the combustion chamber, cooling the catalyst support very rapidly. A catalyst support structure in such a situation might be subjected to a typical temperature change of from 1260° to 300° C. in only 0.02 to 0.1 seconds.

In addition to the requirement of withstanding severe thermal shock, the catalyst support structures must not fail in a manner that would damage the downstream turbine blades. Thus the desirable ceramic structure must not only be able to withstand the very severe temperature fluctuations without breaking, but if it does break, it must fracture into small highly frangible and therefore harmless particles.

The use of ceramic honeycomb structures as catalyst supports is well known in the art. U.S. Pat. No. 4,092,194 and U.S. Pat. No. 3,986,528 describe tubes of multiple layers of ceramic fibers bonded to one another at the points where the fibers cross. The materials used to make these tubes can include alumina or alumina precursors and S glass, so reaction products of these materials may also be present. These structures have channels which are not discrete, but which interconnect between the crossing points of the yarn. See also U.S. Pat. No. 3,949,109 which discloses similar structures of partly sintered glass-ceramic fibers.

Other references disclose extruded ceramic honeycomb shapes. See for example U.S. Pat. No. 4,869,944 which describes a ceramic structure consisting of $SiO_2$, $Al_2O_3$ and MgO, primarily in the form of cordierite. The structure has microcracks which is said to help absorb thermal expansion and thus contribute to resistance to thermal shock. Other extruded or molded structures are taught in U.S. Pat. No. 4,069,157. This patent lists alumina, mullite and cordierite as being useful alternative materials for the manufacture of the structures, but states that the structures can be used at the relatively low temperature of 300° C. (Col. 2, line 3). U.S. Pat. No. 3,255,027 teaches refractory structures which may include honeycombs (col. 4, line 61) made from alumina, and which may include other components such as silica and mullite. Other commonly assigned patents with disclosures of alumina refractories possibly including components such as silica and mullite are U.S. Pat. No. 3,311,488, 3,298,842 and 3,244,540.

None of the references teach ceramic structures capable of surviving the severe conditions described above. Further, the monolithic molded or extruded structures of these references could pose risk of damage to turbine blades in the event they failed, fracturing into large pieces.

SUMMARY OF THE INVENTION

This invention provides rigid ceramic structures capable of withstanding the severe conditions described above. The structures have substantially discrete channels passing all the way through the structure. The chemical composition of the structures is about 20–40% $SiO_2$, about 3–6% MgO and about 54–77% $Al_2O_3$, all of the percentages being by weight. These oxides are present as 50–90% crystalline material, the balance being amorphous. Although the structures are manufactured using glass fibers, substantially no glass fiber remains in the finished structure. The crystalline content is about 15–40% cordierite, 15–35% corundum and 10–30% mullite. These are percentages by weight based on the total weight of the structure including the non-crystalline component. The structure exhibits microcracking throughout.

In a preferred embodiment, the structure is composed of 25–30% $Si_2$, 4 to 5% MgO and 60 to 70% $Al_2O_3$, about 75 to 80 percent of the material being present in crystalline form, 25–30% being cordierite, 25–30% being corundum and 20 to 30% being mullite. Preferred structures are substantially planar in form. In one embodiment, the structures are about 2 inches thick and several feet wide. The channels pass completely through the smallest dimension of the structure.

These structures are prepared by first making a preform of glass fiber. Glass fiber known as S glass is preferred because it does not contain boron compounds which interfere with high temperature performance. The preform is made by laying up layers of glass fibers, the fibers in each layer being parallel to one another, intersecting fibers in adjacent layers, and parallel to fibers in alternate layers. The fibers in alternate layers are aligned with one another so as to define channels through the preform. In a preferred embodiment, the channels are rectangular, and more preferably are square. The preform is wetted with a dispersion of alumina in a solution of alumina precursor, and heated so that the spaces defined by parallel fibers in alternate layers and intersecting fibers in adjacent layers are filled with alumina. At heating temperatures sufficiently high, preferably at least 1380° C., the glass melts and the silica and magnesia in the glass in combination with the alumina in the coating material form cordierite and mullite. Substantially no continuous glass fiber remains, but the walls of the channels through the resulting structure remain intact so there is substantially no interconnection between the channels.

Because the crystalline material of the channel walls is the result of the interaction of glass and alumina, each segment of the final structure corresponding to a layer of glass fibers in the preform exhibits a compositional gradient in the direction of the channels, with $SiO_2$ concentrations being higher in regions nearest the original location of the glass fibers, and decreasing as the distance from the location of the glass fiber increases. The $Al_2O_3$ concentrations will be lower where the $SiO_2$ concentrations are higher, and higher where the $SiO_2$ concentrations are lower.

The invention also includes the ceramic structures described above, coated with a catalyst and, in addition, thermal insulation materials and processes for their formation. More particularly, in the design, construction and operation of high temperature furnaces, the properties of the thermal insulation material chosen is often critical for a successful outcome. Some properties of primary interest in such uses are thermal conductivity, usage temperature, thermal shock resistance, structural integrity and environmental concerns. These properties help determine the design temperature limit, power requirements, usable size, and potential health or environmental dangers. For furnaces operating in the region above 1000° C., it has previously been necessary to use insulating materials consisting of more or less loosely bonded combinations of ceramic fibers and/or ceramic particulate to obtain the necessary low conductivity with adequate thermal shock resistance. Such material combinations typically have very low structural rigidity and strength and are quite friable, being easily abraded in handling or use. The low strength and rigidity require complex design and attachment to span larger furnace chamber roofs, and both housekeeping problems and potentially serious health hazards can arise from the fibers and particulate lost from the material surface in ordinary use of the furnaces. This invention includes materials and processes for their formation which address the problems of strength, stiffness and friability in high temperature thermal insulation materials and yet retain the necessary low conductivity and high thermal shock resistance.

DETAILED DESCRIPTION OF THE INVENTION

Figure 1:
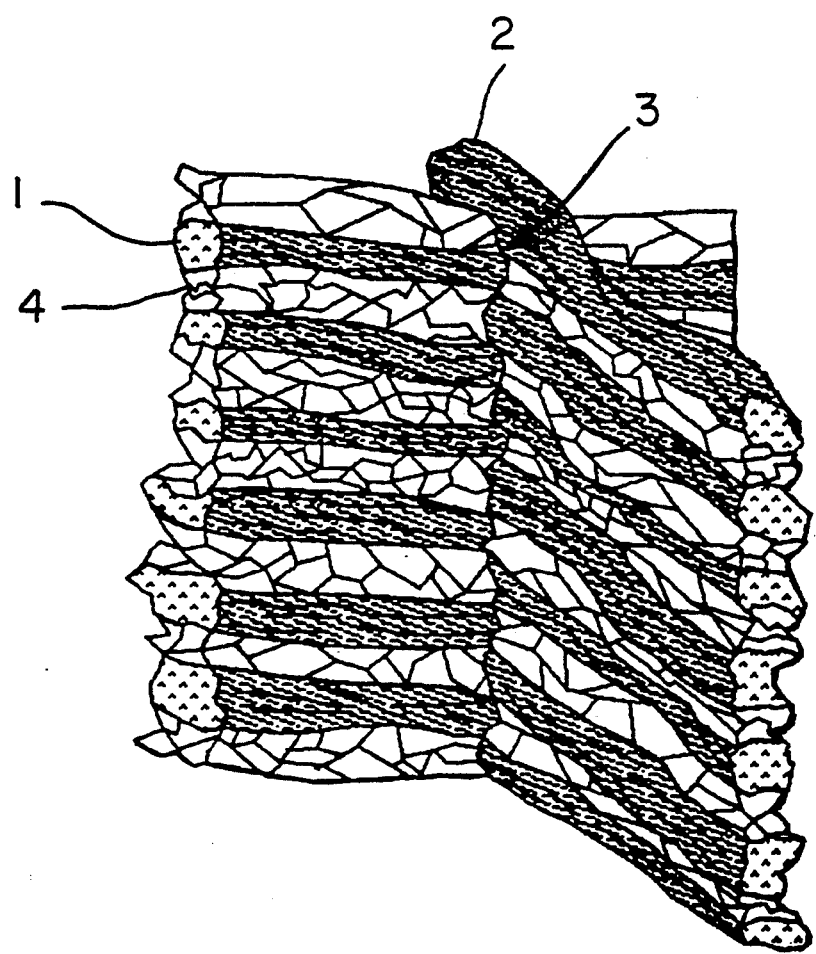
FIG. 1 shows a small segment of the structure of this invention.

The glass fibers useful in this invention are substantially free of boron compounds. They are commercially available from Owens-Corning under the name S-glass or S-2 glass fibers. The fiber size and arrangement in the preform are selected so as to define the desired number per unit area of channels in the final product. The description above concerning plying layers of parallel fibers which intersect with fibers in adjacent layers is meant to include as an alternate method, the use of mats or woven screens of glass fibers in which each fiber alternately passes over and under successive intersecting fibers. Such screens can be layed up and aligned to make the fiber preform in place of arranging individual fibers. Such screens or mats or individual fibers may also be wetted with the alumina mixture prior to combining the screens or mats to make a preform. The language used to describe the process of making the claimed structures is meant to include either wetting the preform after it is made, or wetting the components used to make the preform.

If the preform is to be made by layering arrays of fibers, machines, for example as described in U.S. Pat. No. 4,867,825, may be used to lay down layers of fibers.

Alumina useful in the process of this invention is commercially available as grade A-16 alpha alumina powder from Alcoa. Alumina precursors are soluble basic aluminum salts. A suitable alumina precursor solution is sold by Reheis Chemical Company. It is known as "Chlorhydrol" aluminum chlorohydrate solution. A mixture of alumina and water is prepared and the pH is adjusted with hydrochloric acid so that it is less than 1. Chlorhydrol is added to the mixture as is a small amount of MgCl and the mixture is stirred and heated to permit polymerization of the Chlorhydrol. The stirring time and temperature are not critical. Stirring at a temperature about 60° C. overnight should be sufficient.

Alternatively, in order to audit the use of a mineral acid, an aqueous dispersion of fumed alumina may be used. The particulates of this alumina may be between 1 to 100 nm in size, more preferably in 5 to 30 nm range. The fumed alumina is commercially available from Degussa Corporation and is formed by the flame pyrolysis of aluminum chlorides. The crystalline phase is usually in transitional alumina forms (gamma, delta, eta, etc.,), preferably in the delta form. This alumina can be dispersed in water using organic acids such as formic acid, acetic acid, etc., as deflocculating agents. Other aluminas used in this invention are commercially available as grade A-16 SG and A-17 alumina powders from Alcoa. These aluminas are available in the alpha form and have particulate sizes in 0.1 to 10 um, preferably in 0.1 to 3.0 um sizes.

The coating dispersion from these materials can be made by suspending 5 to 20 parts of fumed alumina in 35 to 50 parts of deionized water. The above mentioned organic acids are added to facilitate the dispersion and deflocculate fumed alumina. The final pH of this dispersion is adjusted with organic acids to 3.0 to 4.5, preferably to pH 4.0. After stabilizing at said pH for about 1 to 3 hours, preferably for 2 hours, 30 to 60 parts of powder alumina, either A-16 SG or A-17, is added to the dispersion and stirred well. Thus, the coating dispersion contains about 50 to 65 parts of solid content and 35 to 50 parts of water. The viscosity of the dispersion measured using a Brookfield RVT Viscometer ranges from 50 to 500 cps. The viscosity of the dispersion can be varied from 50 to 1000 cps by varying the total solids content, the relative amounts of fumed versus powdered alumina, and the pH of the dispersion. For optimum matrix pick up, the preferred viscosity of the dispersion is in the range of 50 to 300 cps, more preferably in the 75 to 200 cps range. The final pH of the dispersion is maintained between 5.0 to 6.5, preferably 5.5 to 6.0, by adding organic acids. Such a dispersion wets the glass fibers mentioned above, diffuses easily in the yarn region, and coats smoothly. The dispersion viscosity remains within ± 5% range for extended periods of stirring if properly covered to prevent water evaporation.

To coat the preform with the alumina mixture, the preform is simply immersed in the alumina mixture. The preform may be left in the mixture for a period of time, for example 45 minutes, to assure complete wetting. The preform is then removed from the alumina mixture and allowed to drain. Alternatively, it may be satisfactory to spray the alumina mixture onto the preform. It may be necessary to turn or tilt the wetted preform from time to time as it is draining to assure even coating of the fibers. The coating process should be carried out so that the spaces between parallel fibers in alternate layers are filled, but the spaces between fibers in the same layer are not filled, thus defining discrete non-interconnecting channels in the structure. It is acceptable for there to be some areas where there is some interconnection between the channels, but in general these interconnections are to be minimized because they represent defects which can lead to fracture of the structure in use. The term "substantially discrete channels" is meant to describe structures in which the interconnections between channels are small enough or few enough in number that the operability of the structure is not impaired. By the process of this invention it is possible to produce a structure in which less than 1% of the spaces between fibers in alternate layers remain unfilled with ceramic material.

The coated preform is then dried. Drying at room temperature for about 10 hours is generally sufficient. It may be necessary to repeat the coating and drying step several times to obtain a satisfactory coating on the glass fibers. The dried coated preform is then heated. In a typical heating cycle the oven temperature is increased at a rate to 10° C. per minute until the maximum temperature is reached. A preferred maximum temperature is about 1380° C. The maximum temperature is maintained for 1 to 2 hours, after which the oven temperature is decreased at a rate of about 10° C. per minute until the temperature is 800° C. or less. The maximum temperature and time must be sufficient to permit interaction of $SiO_2$, MgO and $Al_2O_3$ to form mullite and cordierite. As used herein, the term cordierite in intended to include indialite, a crystalline material having the same chemical composition as cordierite, but a slightly different morphology.

As the interaction occurs, $SiO_2$ and MgO originally present in the glass fiber used to make the preform migrate away from the glass fiber location, but their concentration will be higher nearer their original position and lower as the distance from their original position increases. Thus, the final structure will not be uniform in composition throughout, but will have layers corresponding to the layers of glass in the preform.

In some locations it is possible that the $SiO_2$ will have completely flowed or migrated from its original location, and a hole will exist inside the channel wall corresponding to the original location of the fiber. This is not a defect in the structure, since the hole will be surrounded by ceramic material, and there will be no interconnection between adjacent channels.

The formation of crystals of mullite, cordierite and corundum, each having different coefficients of thermal expansion, leads to the formation of microcracking in the structure. These microcracks form along crystalline boundaries, and within regions having only a single phase. These microcracks absorb stresses created by thermal shock. Further, the layered nature of the structure, with the layers being generally perpendicular to the channels, tends to deter formation or propagation of cracks which are parallel to the channels. Cracking running perpendicular to the channels is less likely to lead to structural failure than cracking along the channels.

Since the structures of this invention are extensively microcracked, they are relatively weak and very frangible. In the event of fracture, the structures readily disintegrate into very small powdery particles which pose no threat of damage to equipment such as turbines used in conjunction with the structures.

FIG. 1 shows a small segment of material broken from a larger structure of this invention. Ceramic material resulting from the interaction of glass and alumina, 1 and 2, indicate the original position of the glass fibers in the preform. Such fibers were in adjacent layers and intersected one another at 3. This ceramic material, 1 and 2, exhibits microcracks primarily along the original fiber axis. The ceramic material, 4, filling the space between the location of parallel glass fibers in alternate layers of the preform exhibits microcracking in rather large blocky sections. Not susceptible of illustration in the drawing is the compositional gradient in each layer discussed above. In fact, there is not a sharp line of demarcation between the material derived from the glass and the material derived from the alumina. The final composition is a result of the melting and diffusion of glass components through and interaction with the alumina.

The description of the method of making the structures of this invention as set out above has identified glass fiber as the $SiO_2$ source, and an alumina-alumina precursor mixture as the alumina source. However, structures of this invention can also be made by substituting alumina fibers such as those described in U.S. Pat. No. 3,808,015 for the glass fibers in the above described process, and substituting for the alumina-alumina precursor mixture a silica source such as a commercially available silica sol, or a silica precursor such as a silicic acid solution, or a mixture of both. The silica source should contain a small amount of magnesia.

The structures of this invention are readily coated with catalysts, or with particles containing catalysts by techniques known in the art. See for example U.S. Pat. No. 4,624,940 and U.S. Pat. No. 4,609,563 for a discussion of catalysts and the methods of applying them to ceramic substrates.

EXAMPLE 1

A glass fiber preform was made as follows. Fibers of continuous filament glass fiber (S-2 CG 75 1/0 1.0 z 636 designation available from Owens/Corning Fiberglas Corp.) were arranged on a pin frame in layers of 48 parallel fibers spaced 0.125 inches center to center alternating with layers of 46 parallel fibers with the same spacing so that fibers in adjacent layers crossed one another at right angles. The completed preform had 450 layers of fibers and was 4.25 inches in depth.

The preform and its support frame were placed in a container of ceramic slurry of depth sufficient to cover the fibers. The slurry was prepared by charging 64.7 pounds of deionized water and 40.8 grams of HCl to a mixing vessel. To this mixture 75 pounds of A-16 alumina powder from Alcoa were added while the mixture is agitated. The pH was adjusted to about 0.25 with additional HCl, and Chlorhydrol aluminum chlorohydrate solution (Reheis Chemical Company) was added. The temperature of the mixture was increased to 63° C., about 719 grams of MgCl were added and the mixture was agitated overnight. The mixture was then stored in gallon containers until needed. Prior to use the viscosity of the slurry was adjusted to 250 centipoise with distilled water. The preform was immersed in the slurry for 45 minutes. The preform was removed and allowed to drain in a horizontal position for 15 minutes, and then for an additional 60 minutes tilted on edge. During the latter period, the preform was rotated through 180° after 30 minutes and through another 180° turn at the end of the period. The preform was air dried overnight. The preform was removed from the frame and trimmed to 6×5.5×3.75 inches, the depth having decreased during the drying process. The preform was heated in a vented oven at 700° C. for one hour, cooled to room temperature and the dipping, draining, drying and firing cycle was repeated.

After the second low temperature firing, the preform was heated in a non-vented high temperature furnace. The temperature was increased to 800° C. in about 40 minutes, held for about 10 minutes, increased to 1380° C. at a rate of 10° C./minute, held at 1380° for 2 hours, cooled to 800° C. at a rate of 5° C./minute, followed by unrestrained cooling to 200° C., after which the preform was removed from the furnace and allowed to come to room temperature.

The structure had a final bulk density of 0.535 g/cc, and a pattern of 65.5 discrete channels per square inch. Average molecular analysis was 26.3% $SiO_2$, 68.95% $Al_2O_3$, and 4.4% MgO. Analysis results for crystalline components were 27.5% cordierite (indialite), 28% corundum and 21.5% mullite. All percentages are by weight.

EXAMPLE 2

A glass fiber preform was made by arranging continuous filament glass fiber (S-2 CG 75 1/0 1.0 z 636 designation available from Owens-Corning Fiberglas Corporation) on a pin frame of 48 parallel fibers spaced 0.125 inches center to center alternating with layers of 48 parallel fibers with the same spacing so that fibers in adjacent layers crossed one another at right angles. The completed preform had 500 layers of fibers and was 4.25 inches in depth.

An alumina dispersion was prepared by charging 17 liters of deionized water into a 30 liter Nalgene tank. 35 ml of formic acid was added to this water and the contents were stirred using an air driven motor. 3.4 kg of fumed alumina (Degussa) was added slowly. The pH of the milk-like dispersion was adjusted to 4.0 to 4.1 using formic acid. After stabilizing at this pH for two hours, 13.6 kg of A-16 alumina was added in portions with effective stirring to avoid any lump formation. The dispersion was then stirred overnight. The viscosity of the dispersion was 52–53 cps, measured with a RVT Brookfield viscometer using #1 spindle at 100 rpm. This dispersion was then stored in nalgene containers until needed.

The preform was immersed in the dispersion for 30 minutes, removed and allowed to drain in a horizontal position for 15 minutes, then for an additional 60 minutes tilted on its edges. During the latter period the preform was rotated through 180° after 30 minutes and through another 180° turn at the end of the period. The preform was air dried overnight, removed from the frame, and heated in a furnace at 800° C. for one hour. The dipping, draining, drying and firing cycle was repeated two times to give 60% weight gain based on the total weight of the product.

The sample thus prepared was then fired in a high temperature furnace. The temperature was increased to 800° C. in about 40 minutes, held for about 20 minutes, and increased to 1380° at a rate of 2° C./minute, held at 1380° C. for two hours, cooled to 800° C. at a rate of 5° C./minute, then followed by unrestrained cooling of the furnace to 200° C. The form was then removed from the furnace and allowed to cool to room temperature in air.

The structure has a final bulk density of 0.53 g/cc and a pattern of 64 discrete channels per square inch. Average molecular analysis was 29.6% $SiO_2$, 65.6 $Al_2O_3$ and 4.7% MgO. Analysis results for crystalline components were 31% of cordierite (indialite), 51% of corundum and 9% of mullite. All percentages are by weight.

EXAMPLE 3

A matrix slurry of alumina/zirconia in a ratio of 4:1 by weight was prepared by adding 275 grams of powdered zirconium acetate (product of Magnesium Electron, Inc.) solution. After complete dissolution of the zirconium acetate, 3.2 kg of A-17 alumina (product of Alcoa) was added to the solution and stirred overnight. The viscosity of the dispersion was in the range of 240–250 cps. The total solid content on the weight basis for the slurry was about 62%.

A S-2 glass 8 harness satin fabric (product of Owens-Corning) was cut in 12"×12" dimensions. The size from the fabric was removed by heating in air at 700° C. for one hour. Approximately 20 such layers were stacked on a Teflon-coated surface. Slurry was spread evenly on the bottom layer with a brush and then coated with the next layer of fabric. The excess slurry was removed by rolling a plastic roller on the wetted fabric. This step was continued for the remaining fabric layers. The wet board made by the above process was allowed to dry at ambient conditions for two days. The dried board was fired at 800° C. for 2 hours in air. The material was trimmed at the edges for weighing. The matrix pickup was about 57 wt. % to the total weight of the board. The thickness and density of the board at this stage were 0.85 cm and 1.58 g/cm$^3$, respectively. The low fired board was again fired at 1450° C. for four hours in a programmed furnace heating and cooling cycle. The thickness of the board decreased by about 10–15% and the density increased to 1.63 g/cm$^3$.

The phase composition of the high fired material, analyzed by X-ray diffraction, on a weight basis corresponded to 34% corundum, 24% mullite, 28% indialite, 11% zircon and 3% monoclinic zirconia.

EXAMPLE 4

A matrix slurry was prepared from 240 pounds of A-17 alumina (product of Alcoa), 40 pounds of AG fumed alumina (product of Degussa) and 130 pounds of distilled water. Mixture was homogenized for 1 hour and then stirred for 18 hours and viscosity measured to be approximately 400 centipoise. A portion of this slurry was removed and glycerol (as a humectant) was added to this in the quantity necessary to form 5% by weight of the whole. Viscosity of this modified slurry, which was used for the sample preparation, was determined to be approximately 250 centipoise. A fabric of S-2 "Fiberglas" (a registered trademark of Owens-Corning) being woven in the form of an 8 harness satin with a basis weight of about 290 grams/m$^2$ was used for preparation of this sample. Finish was removed from this fabric by heating in air to 700° C. for 1 hour. Twenty sheets of this fabric were cut to the dimensions of approximately 15 inches×24 inches. These sheets were stacked on a polyethylene film surface with addition of the above described matrix slurry between each successive sheet. Slurry was applied by use of a paint brush and paint roller to spread slurry which had been poured on the sheets. As each layer was lain down, the excess slurry was removed by rolling the combined wetted sheets with a plastic roller of 3 inch diameter. After all of the sheets were placed and saturated with the matrix slurry, the entire stack of sheets was further rolled to remove any excess material remaining. This stack of matrix saturated sheets was air-dried overnight and then inverted and the plastic film peeled off. Excess matrix material was removed from this newly exposed surface with a damp sponge to improve appearance. Air-drying was continued for three days additional time. The dried matt was fired in air to 700° C. for three hours. This low-fired board was trimmed to uniform dimensions and weighed to determine matrix pickup and unit density. Pickup was determined to have been 58% based on total final weight of board. Thickness of the board was measured at 0.29 inch and density calculated to be 1.9 grams/cc. This low-fired board was weighted with alumina bricks to a loading of approximately .0.5 pound per square foot and then fired through a programmed furnace cycle reaching a maximum temperature of 1450° C. for 2 hours. After cooling to room temperature, the thickness of the board was remeasured as 0.27 inch and the high-fired density calculated as 2.0 grams/cc.

We claim:

1. A ridged ceramic structure made by laying up separate glass fibers in multiple layers so that fibers in a single layer are approximately parallel and intersect with fibers in adjacent layers, and fibers in alternate layers are approximately parallel, forming channels through the structure, wetting the preform with a mixture of alumina and heating the wetted preform so that spaces defined by parallel fibers in alternate layers and intersecting fibers in adjacent layers are substantially filled with ceramic material resulting from interaction of the glass fiber and alumina wherein no glass fiber remains in the finished ceramic structure and the multiple layers are normal to the channels, said layers have a compositional gradient in the direction of the channels.

2. The process of claim 1 wherein the glass fiber is free of boron compounds and the final heating temperature is at least 1380° C.

3. The process of claim 1 wherein the mixture of alumina contains an alumina precursor.

* * * * *